UNITED STATES PATENT OFFICE.

WILLIAM A. COWAN, OF BROOKLYN, NEW YORK, ASSIGNOR TO UNITED LEAD COMPANY, OF NEW YORK, N. Y., A CORPORATION OF NEW JERSEY.

HARD LEAD ALLOY.

1,360,269.  Specification of Letters Patent.  Patented Nov. 30, 1920.

No Drawing. Application filed August 11, 1919. Serial No. 316,774.

*To all whom it may concern:*

Be it known that I, WILLIAM A. COWAN, United States citizen, residing in Brooklyn, New York, have invented the following described Improvements in Hard Lead Alloys.

My invention consists in the hardening of lead by mixing or alloying with it a small percentage of lithium with or without other ingredients.

I proceed as follows:

To a quantity of lead I add, in any suitable manner, an amount of lithium varying from a small fraction of a percentum to 3% according to the degree of hardness required. Thus, for example, an addition of lithium equal to about 1% of the lead will produce a degree of hardness corresponding approximately to 17 on the Brinell scale. An addition of 2% will give a hardness approximating 25 on the same scale.

Other metals may also be present or be introduced for special purposes. A small percentage of aluminum is desirable to restrict the tendency to dross. An addition of mercury from say, .10% to 2.% has a tendency to increase the hardness and may be used in place of some of the lithium. Still other metals may likewise be mixed with the new alloy to impart their own known characteristics more or less to the product.

The lithium is best alloyed with the lead electrolytically in the well known manner, as for example, by electrolyzing the fused chlorid of lithium in the presence of molten lead acting as the cathode of an electric cell.

Claim.

A hard lead alloy containing a main body of lead and a small percentage of lithium.

In testimony whereof, I have signed this specification.

WILLIAM A. COWAN.